United States Patent
Misaka et al.

(10) Patent No.: US 11,014,491 B2
(45) Date of Patent: May 25, 2021

(54) DIRECTION INDICATION MECHANISM

(71) Applicant: KABUSHIKI KAISHA TOKAI RIKA DENKI SEISAKUSHO, Aichi (JP)

(72) Inventors: Keiji Misaka, Aichi (JP); Seisuke Endo, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 102 days.

(21) Appl. No.: 16/345,930

(22) PCT Filed: Sep. 12, 2017

(86) PCT No.: PCT/JP2017/032884
§ 371 (c)(1),
(2) Date: Apr. 29, 2019

(87) PCT Pub. No.: WO2018/079108
PCT Pub. Date: May 3, 2018

(65) Prior Publication Data
US 2020/0062171 A1    Feb. 27, 2020

(30) Foreign Application Priority Data
Oct. 31, 2016    (JP) .............................. JP2016-213503

(51) Int. Cl.
*B60Q 1/42*    (2006.01)
*G05G 1/04*    (2006.01)
*G05G 5/05*    (2006.01)

(52) U.S. Cl.
CPC ............... *B60Q 1/425* (2013.01); *G05G 1/04* (2013.01); *G05G 5/05* (2013.01); *G05G 2505/00* (2013.01)

(58) Field of Classification Search
CPC . B60Q 1/425; B60Q 1/42; G05G 1/04; G05G 5/05; G05G 2505/00
See application file for complete search history.

(56) References Cited

U.S. PATENT DOCUMENTS 5,672,855 A    9/1997    Uchiyama et al.
5,708,240 A    1/1998    Akimoto et al.
(Continued)

FOREIGN PATENT DOCUMENTS

JP    9-50735    2/1997
JP    2005-225265    8/2005
(Continued)

OTHER PUBLICATIONS

International Search Report in International Patent Application No. PCT/JP2017/032884, dated Dec. 19, 2017.
(Continued)

*Primary Examiner* — Thomas C Diaz
(74) *Attorney, Agent, or Firm* — Greenblum & Bernstein, P.L.C.

(57) ABSTRACT

A bracket is rotatable between a neutral position and a direction indication position in response to an operation by a user. A ratchet is slidable between a position where the ratchet enters a rotating trajectory of a cancel cam mounted on a steering shaft of a vehicle and a position where the ratchet retracts from the rotating trajectory interlocking with rotation of the bracket. A first regulating member defines a guide groove that guides sliding of the ratchet that regulates displacement of the ratchet in a direction along the rotating trajectory. A second regulating member is provided on the ratchet and regulates displacement of the ratchet in a direction intersecting both a sliding direction of the ratchet and the direction along the rotating trajectory. A guide groove includes an open end which is opened toward the rotating trajectory.

2 Claims, 12 Drawing Sheets

(56) References Cited

U.S. PATENT DOCUMENTS

| | | | |
|---|---|---|---|
| 6,069,329 A | 5/2000 | Weiss et al. | |
| 7,453,048 B2 * | 11/2008 | Cordier | B60Q 1/425 200/61.27 |
| 10,654,407 B2 * | 5/2020 | Misaka | B60Q 1/42 |
| 2014/0339057 A1 | 11/2014 | Lipfert et al. | |
| 2015/0137964 A1 | 5/2015 | Shimada et al. | |
| 2017/0293317 A1 * | 10/2017 | Kosaka | G05G 5/05 |

FOREIGN PATENT DOCUMENTS

| | | | |
|---|---|---|---|
| JP | 2015-508354 | 3/2015 | |
| WO | 2013/038786 | 3/2013 | |
| WO | WO-2017094510 A1 * | 6/2017 | B60Q 1/40 |

OTHER PUBLICATIONS

Written Opinion of the International Searching Authority issued in International Application No. PCT/JP2017/032884, dated Dec. 19, 2017.

* cited by examiner

DIRECTION INDICATION MECHANISM

TECHNICAL FIELD

The present disclosure relates to a direction indication mechanism mounted on a vehicle.

BACKGROUND ART

U.S. Pat. No. 6,069,329 specification discloses an example of such a direction indication mechanism. The direction indication mechanism includes a rotating member and a ratchet. The rotating member is rotatable between a neutral position and a left turn indication position and between the neutral position and a right turn indication position in response to an operation of a lever by a user. The ratchet is capable of entering and retracting with respect to a rotating trajectory of a cancel cam attached on a steering shaft of a vehicle. When the rotating member is at the neutral position, the ratchet is retracted from the rotating trajectory of the cancel cam.

For example, when the rotating member is rotated from the neutral position to the left turn indication position, the ratchet enters the rotating trajectory of the cancel cam. At this time, when a steering wheel is steered to the right, the cancel cam rotates the ratchet which has entered the rotating trajectory. Along with the rotation of the ratchet, the rotating member is rotated from the left turn indication position to the neutral position. Accordingly, a left turn indication operation of the direction indication mechanism is canceled.

SUMMARY OF INVENTION

Technical Problem

In order to realize smooth sliding and rotation of the ratchet described above, it is necessary to regulate displacement of the ratchet in a direction intersecting both entry and retraction directions with respect to the rotating trajectory of the cancel cam and a rotational direction (that is to say, a direction along the rotating trajectory of the cancel cam) of the ratchet. In the configuration described in U.S. Pat. No. 6,069,329 specification, a guide member is formed with a guide groove to allow the sliding and rotation of the ratchet, and a regulating member having a width larger than a width of the guide groove is provided in the ratchet. Accordingly, the displacement of the ratchet in the direction intersecting the sliding and rotational direction is regulated.

In such a configuration, in a work of assembling the ratchet to the guide member, an operation for changing a posture of the ratchet is required. Specifically, at first, the ratchet is postured such that the wide direction of the regulating member is along the guide groove, and the regulating member is caused to pass through the guide groove. Subsequently, the posture of the ratchet is changed so that the width direction of the regulating member intersects with an extending direction of the guide groove. Accordingly, the regulating member is locked to the guide groove.

However, as automation of an assembly work of components progresses, the above-described posture change complicates the process of automation, which is one cause of increase in manufacturing cost.

Therefore, it is required to improve efficiency of an assembly work of the direction indication mechanism and suppress the increase in the manufacturing cost.

Solution to Problem

One aspect meeting the above-described requirement is a direction indication mechanism to be mounted on a vehicle, the direction indication mechanism including:

a rotating member which is rotatable between a neutral position and a direction indication position in response to an operation by a user;

a ratchet which is slidable between a position where the ratchet enters a rotating trajectory of a cancel cam mounted on a steering shaft of the vehicle and a position where the ratchet retracts from the rotating trajectory interlocking with rotation of the rotating member;

a first regulating member which defines a groove that guides sliding of the ratchet and that regulates displacement of the ratchet in a direction along the rotating trajectory; and a second regulating member which is provided on the ratchet and which regulates displacement of the ratchet in a direction intersecting both a sliding direction of the ratchet and the direction along the rotating trajectory, wherein one end of the groove is opened toward the rotating trajectory.

According to the configuration, although the second regulating member which regulates the displacement of the ratchet in the direction intersecting both the sliding direction of the ratchet and the direction along the rotating trajectory of the cancel cam is provided on the ratchet, the ratchet can be efficiently assembled with respect to the first regulating member which regulates the displacement of the ratchet in the direction along the rotating trajectory of the cancel cam.

In the above-described configuration, one end of the groove is an open end which is opened toward the rotating trajectory of the cancel cam. Therefore, assembly of the ratchet to the first regulating member can be completed only by making a part of the ratchet enter into the groove through the open end, a state where the displacement of the ratchet is regulated by the second regulating member can be established. Since it is unnecessary to change the posture of the ratchet in order to establish this state, it is easy to automate an assembly process. Therefore, efficiency of an assembly work of the direction indication mechanism can be improved, and an increase in manufacturing cost can be suppressed.

The above-described direction indication mechanism is configured as follows.

A protrusion which regulates displacement of the ratchet toward the rotating trajectory is arranged inside the groove.

According to the configuration, once the ratchet is assembled to the first regulating member, the ratchet can be prevented from falling off the open end of the groove. Particularly, when the assembly of the ratchet with respect to the first regulating member is completed, and then these are further assembled to other components to manufacture the direction indication mechanism, since the ratchet can be prevented from falling off the open end, the efficiency of the assembly work can improved.

Namely, particularly, the open end of the groove provided for improving the efficiency of assembling the ratchet to the first regulating member can avoid a situation where the efficiency of the assembly work of the direction indication mechanism is inhibited for another reason.

The above-described direction indication mechanism is configured as follows.

The direction indication mechanism includes:

a moderation surface forming member which forms a moderation surface having at least one of a concave portion and a convex portion; and a moderation piece which holds the rotating member at one of the neutral position and the direction indication position by being displaced along the moderation surface with the rotation of the rotating member, wherein the moderation surface forming member and the first regulating member are integrally molded to be an integrally molded article.

According to the configuration, a function of regulating a position of the moderation piece and a function of regulating the posture of the ratchet can be integrated into one component. Besides, since an increase in the number of components can be suppressed, the efficiency of the assembly work of the direction indication mechanism can be improved.

DESCRIPTION OF EMBODIMENTS

An embodiment will be described below in detail with reference to the accompanying drawings. In each drawing using the description hereinafter, a scale of each member is appropriately adjusted in order to show each member in a recognizable size.

Figure 1:
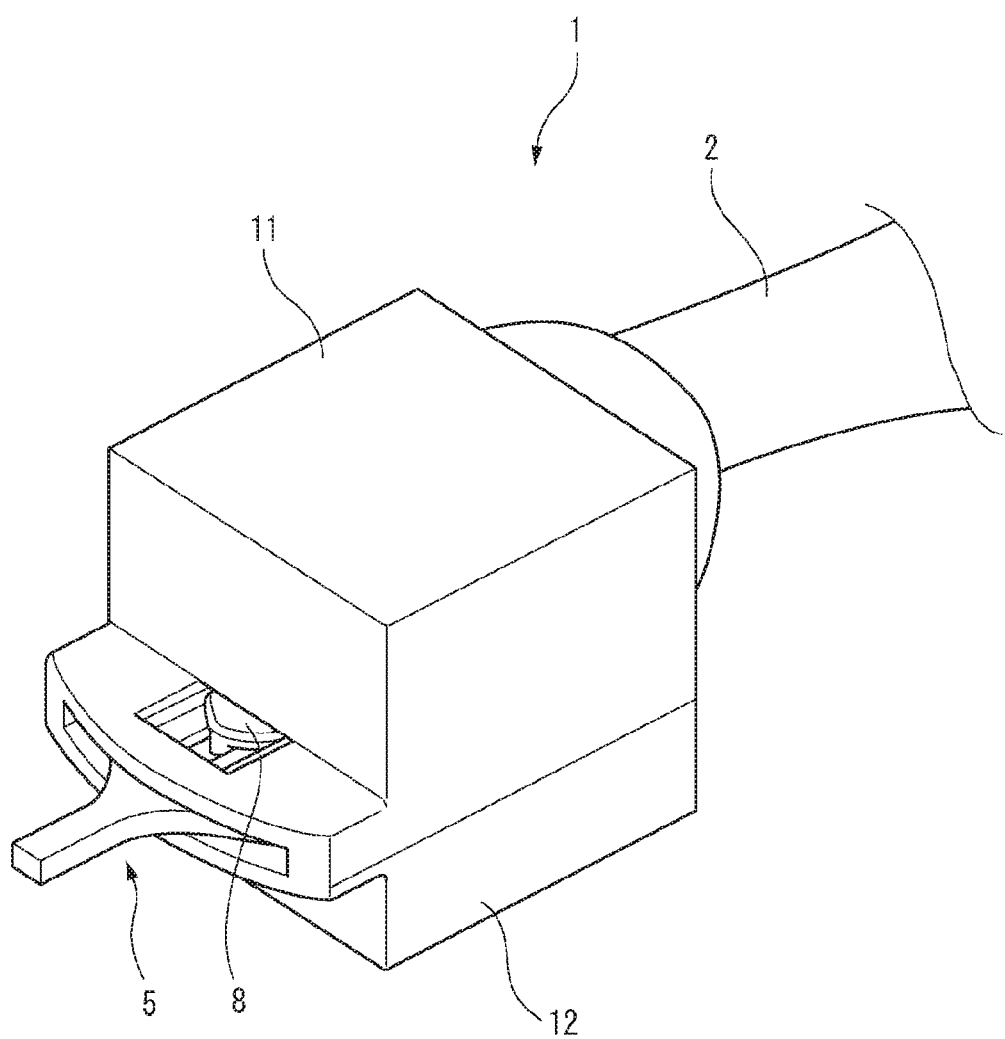
FIG. 1 is a perspective view showing an appearance of a direction indication mechanism according to one embodiment.

FIG. 1 shows an appearance of a direction indication mechanism 1 according to one embodiment. The direction indication mechanism 1 is mounted on a vehicle. Specifically, the direction indication mechanism 1 is arranged on a side of a steering column connected to a steering wheel which controls steering of the vehicle.

The direction indication mechanism 1 includes a lever 2. The lever 2 is operated by a driver in order to turn on/off a direction indication lamp indicating a steering direction of the vehicle.

Figure 2:
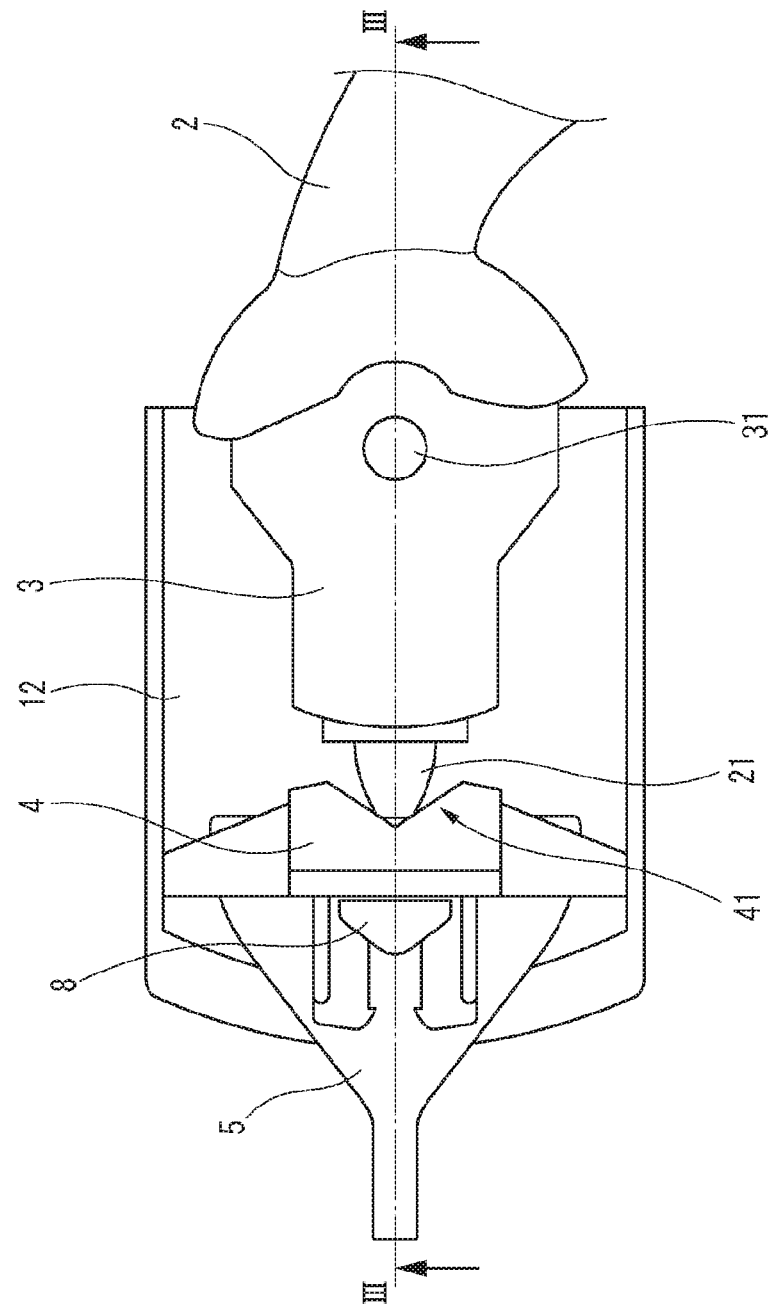
FIG. 2 is a plan view showing a part of the direction indication mechanism in FIG. 1.
Figure 3:
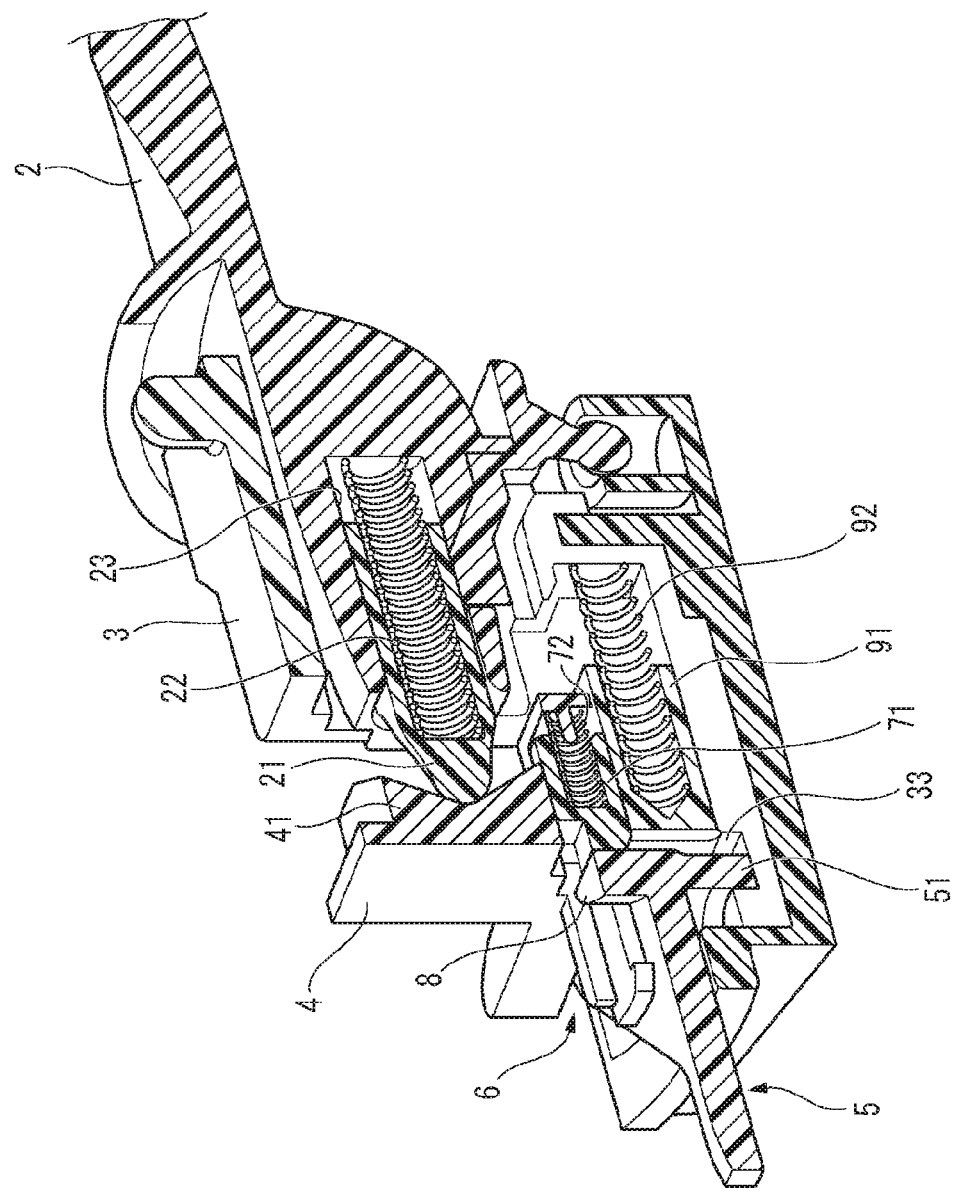
FIG. 3 is a view showing a cross section taken along a line III-III in FIG. 2 as viewed from an arrow direction.

The direction indication mechanism 1 includes a first case 11 and a second cases 12. FIG. 2 shows a configuration in which the first case 11 is detached from a state shown in FIG. 1. FIG. 3 shows a cross section taken along a line III-III in FIG. 2 as viewed from an arrow direction.

The direction indication mechanism 1 includes a bracket 3. The bracket 3 is an example of a rotating member. The bracket 3 includes a rotation shaft 31. The bracket 3 is connected to the lever 2. The bracket 3 rotates clockwise and counterclockwise in FIG. 2 around the rotation shaft 31 in response to an operation of the lever 2.

The direction indication mechanism 1 includes a moderation piece 21 and a coil spring 22. The moderation piece 21 is displaceably connected to a tip end portion of the lever 2. Specifically, as shown in FIG. 3, a part of the moderation piece 21 and the coil spring 22 are arranged inside a sliding hole 23 formed in the lever 2. The moderation piece 21 is slidable within the sliding hole 23 of the lever 2 in accordance with an elastic deformation of the coil spring 22.

The direction indication mechanism 1 includes a moderation surface forming member 4. The moderation surface forming member 4 forms a moderation surface 41. The moderation surface 41 is arranged to so as to face the moderation piece 21. The coil spring 22 urges the moderation piece 21 toward the moderation surface 41.

Figure 4:
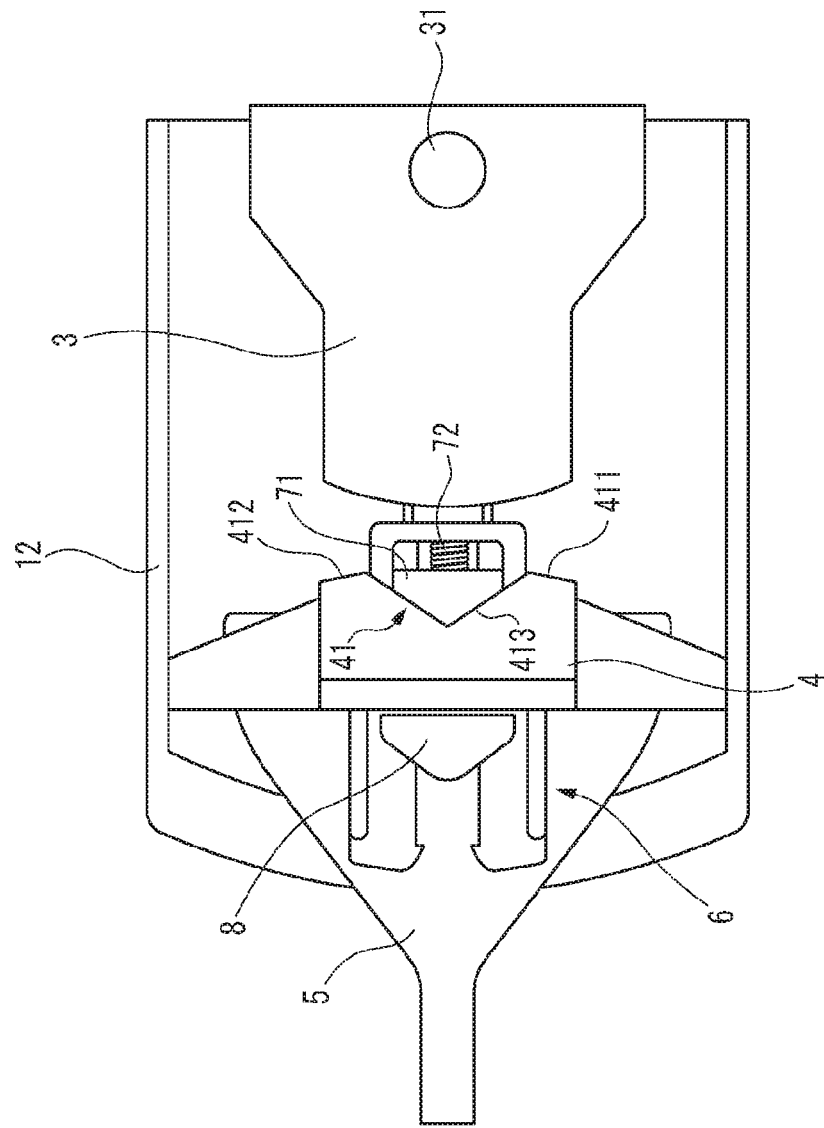
FIG. 4 is a plan view showing a part of the direction indication mechanism in FIG. 1.
Figure 5:
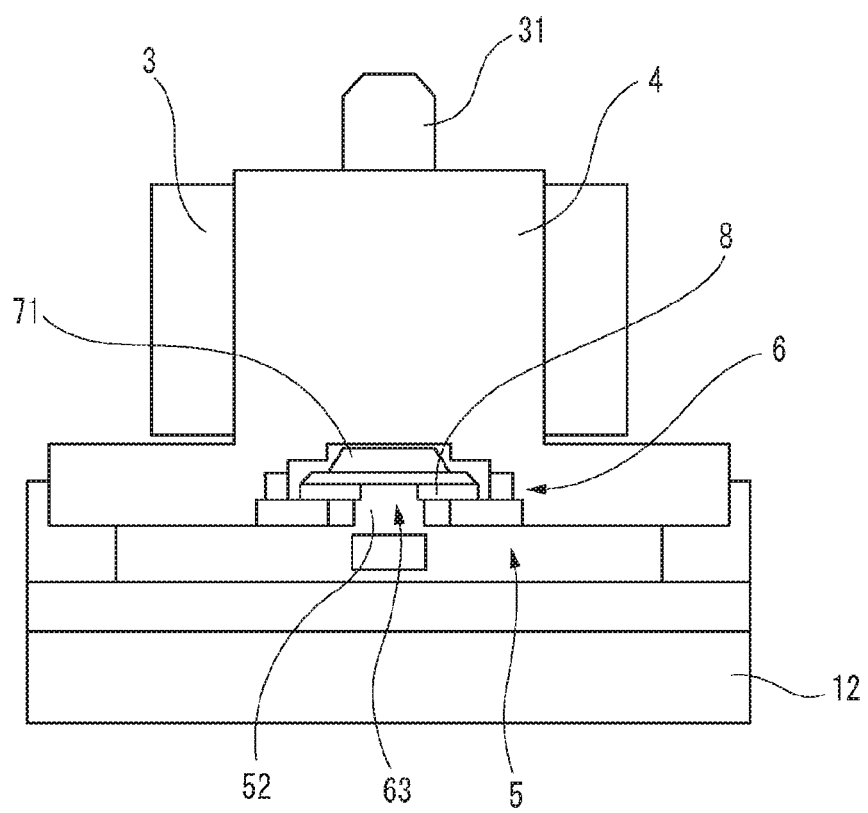
FIG. 5 is a front view showing a part of the direction indication mechanism in FIG. 1.

FIG. 4 is a plan view showing a configuration in which the lever 2 and the moderation piece 21 are detached from a state shown in FIG. 2. FIG. 5 is a front view showing the same configuration.

The moderation surface 41 is partitioned into a left turn holding portion 411, a right turn holding portion 412, and a neutral holding portion 413 by having a concave portion and a convex portion.

FIGS. 2 to 4 show a state where the bracket 3 is at the neutral position. At this time, the moderation piece 21 is arranged at the neutral holding portion 413 of the moderation surface 41.

Figure 6A:
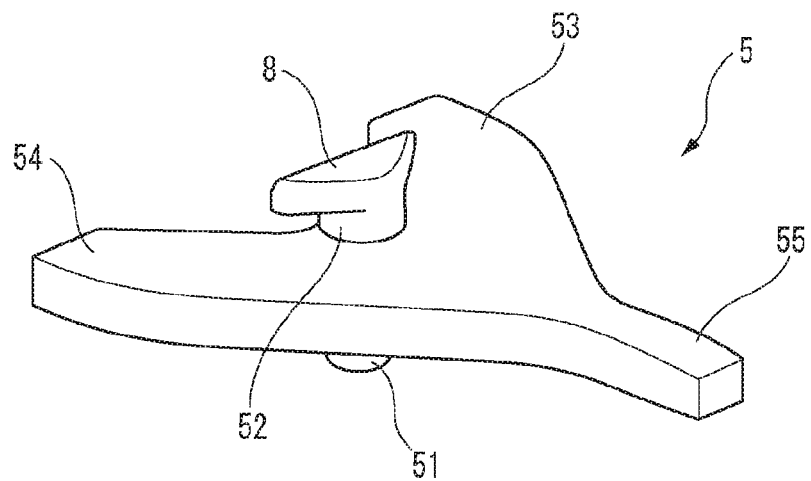
FIG. 6A is a perspective view showing a part of the direction indication mechanism in FIG. 1.
Figure 6B:
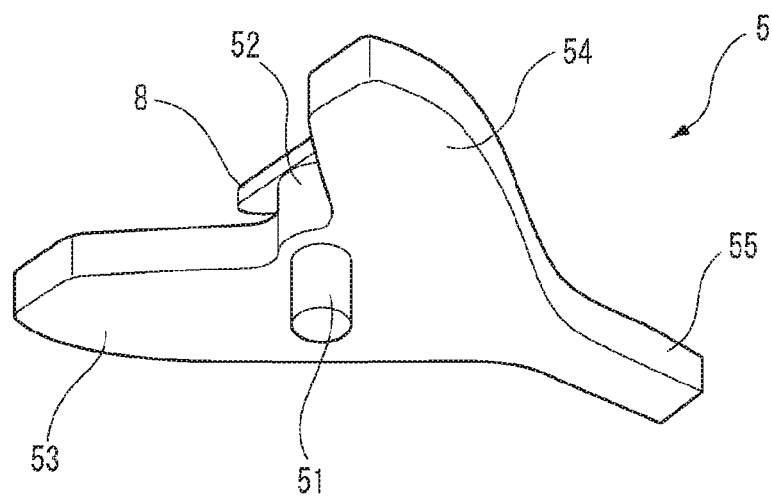
FIG. 6B is a perspective view showing a part of the direction indication mechanism in FIG. 1.

As shown in FIGS. 1 to 5, the direction indication mechanism 1 includes a ratchet 5. FIGS. 6A and 6B show an appearance of the ratchet 5. The ratchet 5 includes a first rotation shaft 51, a second rotation shaft 52, a left turn cancel cam portion 53, a right turn cancel cam portion 54, and an engagement protrusion 55.

Figure 7A:
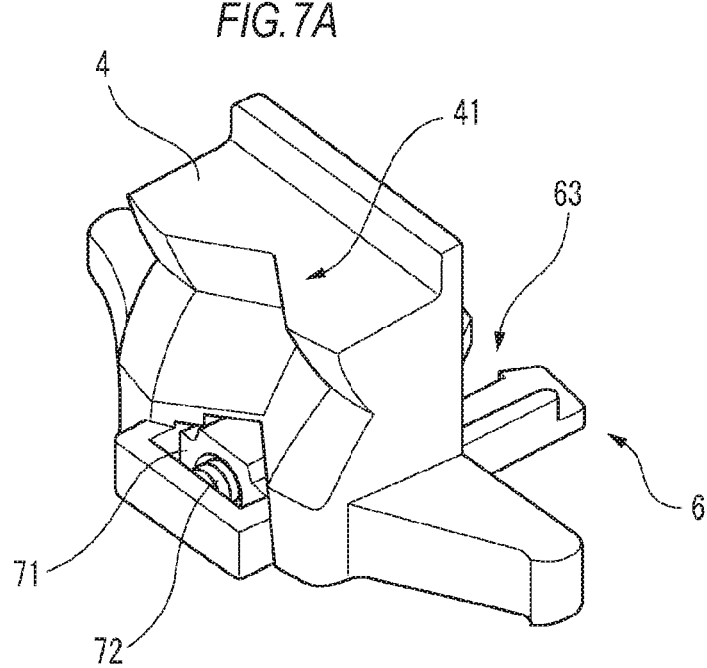
FIG. 7A is a perspective view showing a part of the direction indication mechanism in FIG. 1.
Figure 7B:
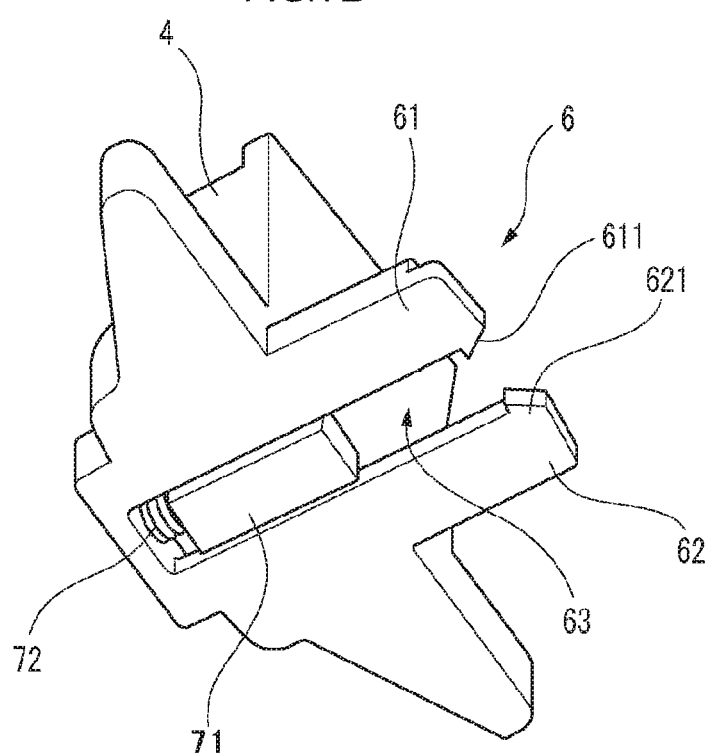
FIG. 7B is a perspective view showing a part of the direction indication mechanism in FIG. 1.

As shown in FIGS. 2 to 5, the direction indication mechanism 1 includes a first regulating member 6. FIGS. 7A and 7B show an appearance of the moderation surface forming member 4 and the first regulating member 6. The first regulating member 6 includes a first arm portion 61 and a second arm portion 62. The first arm portion 61 and the second arm portion 62 define a guide groove 63 therebetween. The first arm portion 61 includes a first protrusion 611. The second arm portion 62 includes a second protrusion 621. The first protrusion 611 and the second protrusion 621 are arranged inside the guide groove 63.

Figure 8:
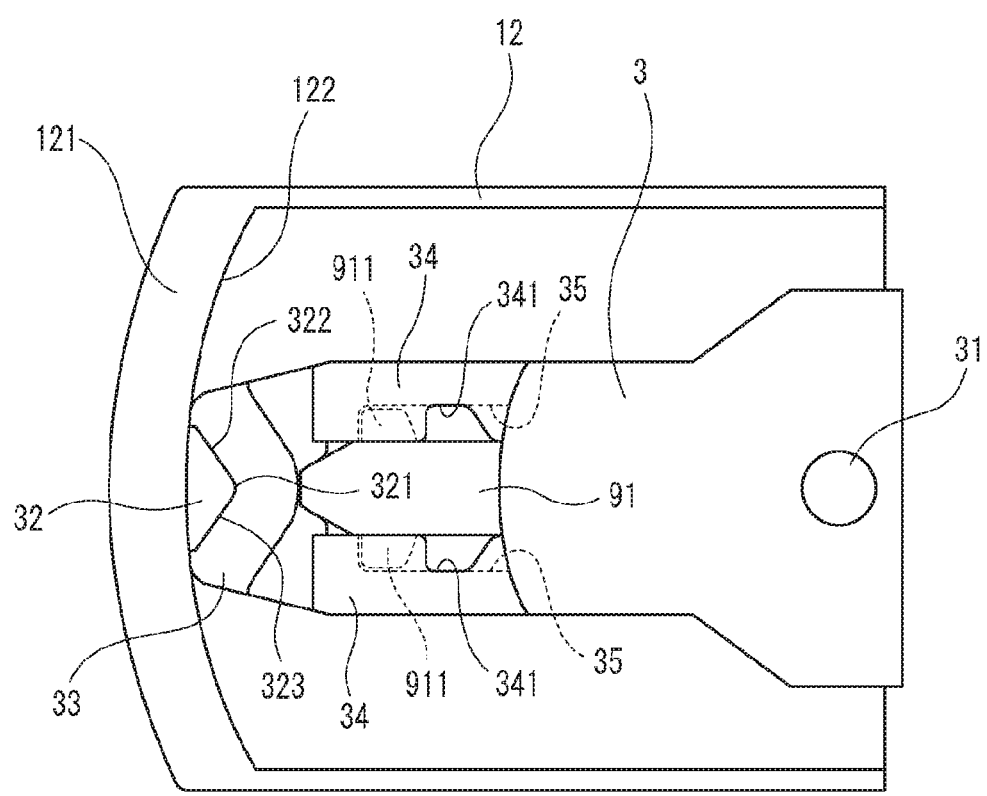
FIG. 8 is a plan view showing a part of the direction indication mechanism in FIG. 1.
Figure 9:
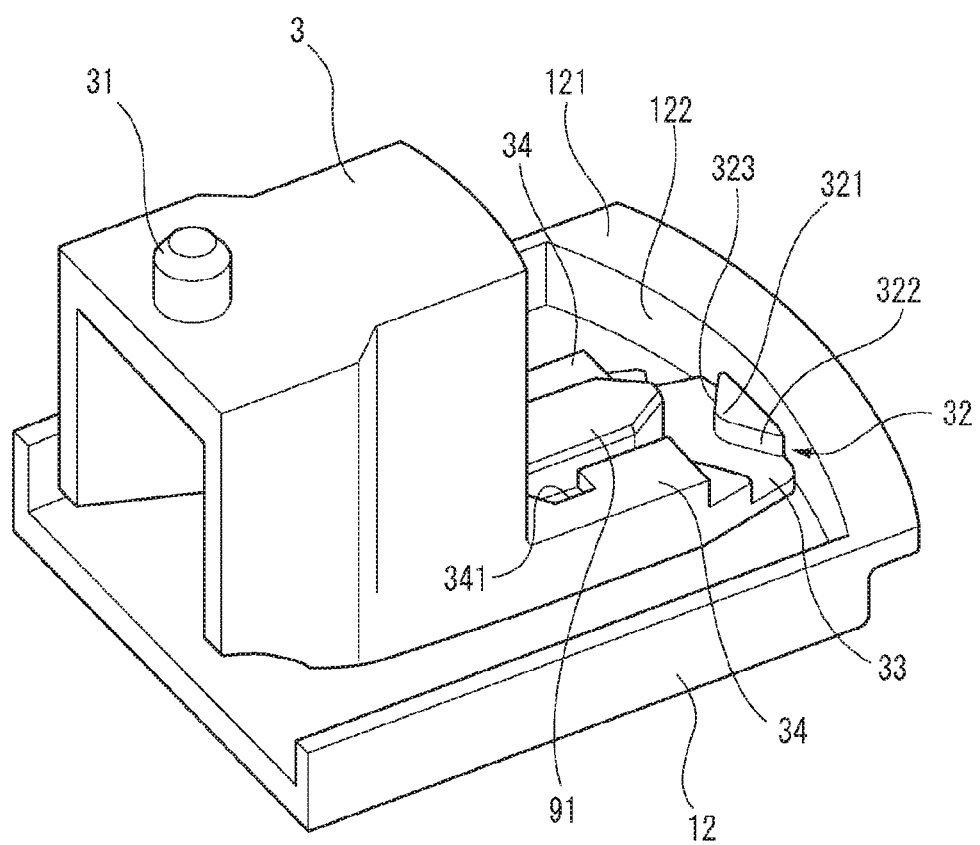
FIG. 9 is a perspective view showing a part of the direction indication mechanism in FIG. 1.

FIGS. 8 and 9 show a structure in which the moderation surface forming member 4, the ratchet 5 and the first regulating member 6 are detached from a state shown in FIG. 4.

The bracket 3 includes a cam surface forming protrusion 32 and a cam groove 33. The cam surface forming protrusion 32 defines a part of the cam groove 33. The cam surface forming protrusion 32 includes a neutral holding portion 321, a left turn cam surface 322, and a right turn cam surface 323. The neutral holding portion 321 is positioned at a boundary between the left turn cam surface 322 and the right turn cam surface 323.

The second case 12 includes a cam surface forming wall 121. The cam surface forming wall 121 extends so as to form an arc-shaped cam surface 122. The cam surface forming wall 121 is arranged such that the cam surface 122 faces the cam surface forming protrusion 32 of the bracket 3.

More specifically, the left turn cam surface 322 of the cam surface forming protrusion 32 is adjacent to any part of the cam surface 122 of the cam surface forming wall 121 regardless of a rotation position of the bracket 3 accompanying an operation of the lever 2. Similarly, the right turn cam surface 323 of the cam surface forming protrusion 32 is adjacent to any part of the cam surface 122 of the cam surface forming wall 121 regardless of the rotation position of the bracket 3 accompanying the operation of the lever 2.

As shown in FIG. 3, when the bracket 3, the ratchet 5 and the first regulating member 6 are assembled, the first rotation shaft 51 of the ratchet 5 is arranged inside the cam groove 33 of the bracket 3. On the other hand, as shown in FIG. 5, the second rotation shaft 52 of the ratchet 5 is arranged inside the guide groove 63 of the first regulating member 6.

As shown in FIGS. 3 to 5, the direction indication mechanism 1 includes a pressing member 71 and a coil spring 72. As shown in FIGS. 7A and 7B, the pressing member 71 and the coil spring 72 are assembled to the first regulating member 6. The pressing member 71 is slidable along the guide groove 63 of the first regulating member 6.

As shown in FIGS. 4, 5, 8 and 9, in a state where the bracket 3 is at the neutral position, the pressing member 71 presses the second rotation shaft 52 of the ratchet 5 by an urging force of the coil spring 72. Accordingly, the ratchet 5 receives an urging force in a direction away from the bracket 3, but the first rotation shaft 51 of the ratchet 5 abuts against the neutral holding portion 321 of the cam surface forming protrusion 32 of the bracket 3, preventing displacement of the ratchet 5 in the direction. As a result, the ratchet 5 is held at a position shown in FIG. 4.

As shown in FIGS. 1 to 5, the direction indication mechanism 1 includes a second regulating member 8. As shown in FIGS. 6A and 6B, the second regulating member 8 is provided at the second rotation shaft 52 of the ratchet 5. A width dimension of the second regulating member 8 in a width direction of the guide groove 63 of the first regulating member 6 is larger than that of the guide groove 63.

Figure 10A:
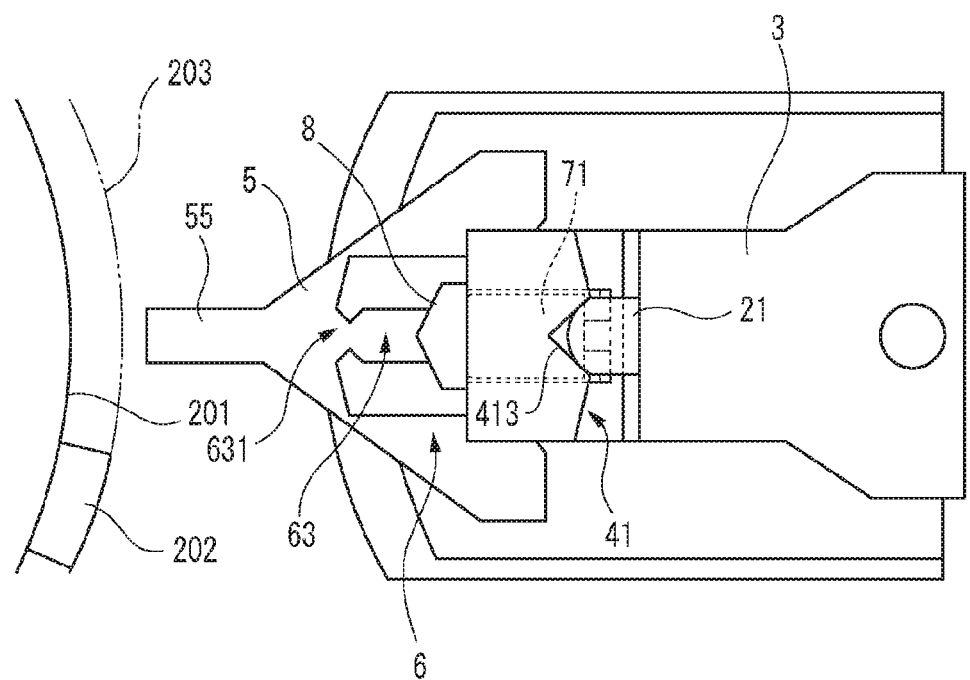
FIG. 10A is a view schematically showing an operation of the direction indication mechanism in FIG. 1.
Figure 10B:
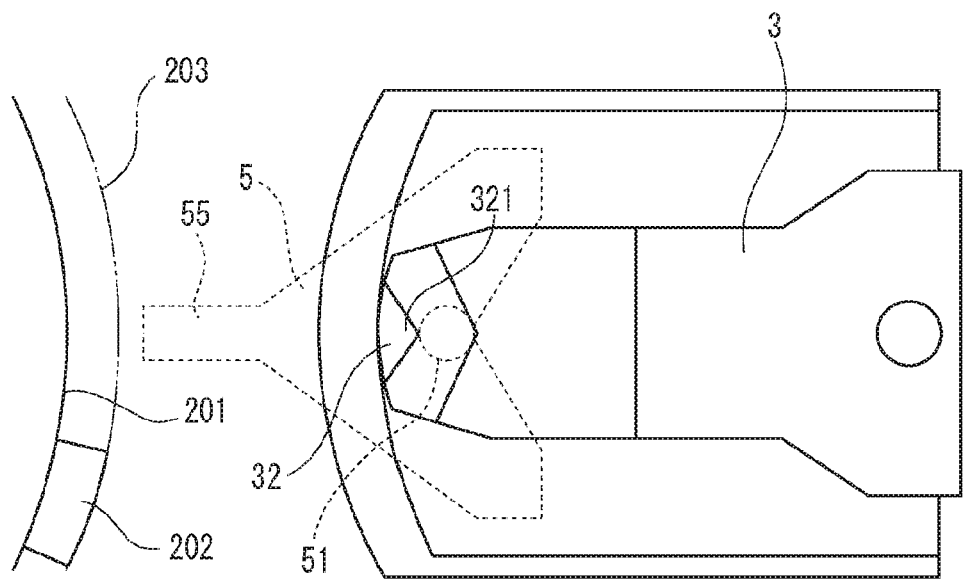
FIG. 10B is a view schematically showing an operation of the direction indication mechanism in FIG. 1.

Next, a direction indication operation will be described based on the above-described configuration. FIGS. 10A and 10B show a state in which the bracket 3 is at the neutral position. In these drawings, shapes of the respective components have been simplified.

As described above, when the bracket 3 is at the neutral position, the moderation piece 21 is arranged at the neutral holding portion 413 of the moderation surface 41. The pressing member 71 urges the ratchet 5 toward a rotating trajectory 203 of a cancel cam 202 mounted on a steering shaft 201 of a vehicle. However, displacement of the ratchet 5 in the same direction is prevented by the first rotation shaft 51 of the ratchet 5 abutting against the neutral holding portion 321 of the cam surface forming projection 32 of the bracket 3, so that the engagement protrusion 55 of the ratchet 5 is retracted from the rotating trajectory 203 of the cancel cam 202.

Figure 11A:
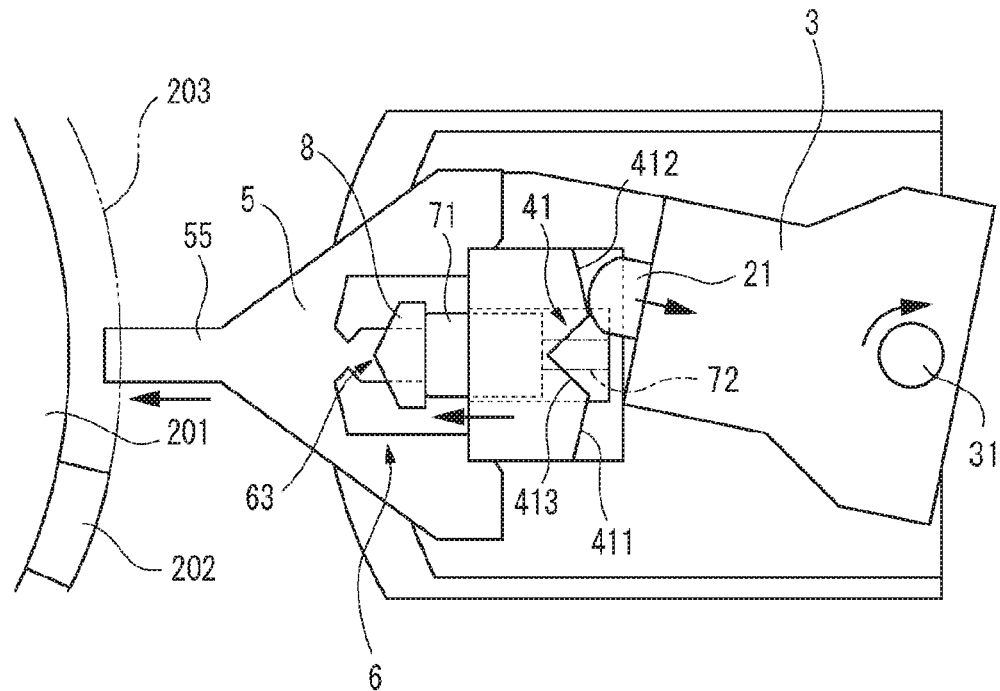
FIG. 11A is a view schematically showing an operation of the direction indication mechanism in FIG. 1.
Figure 11B:
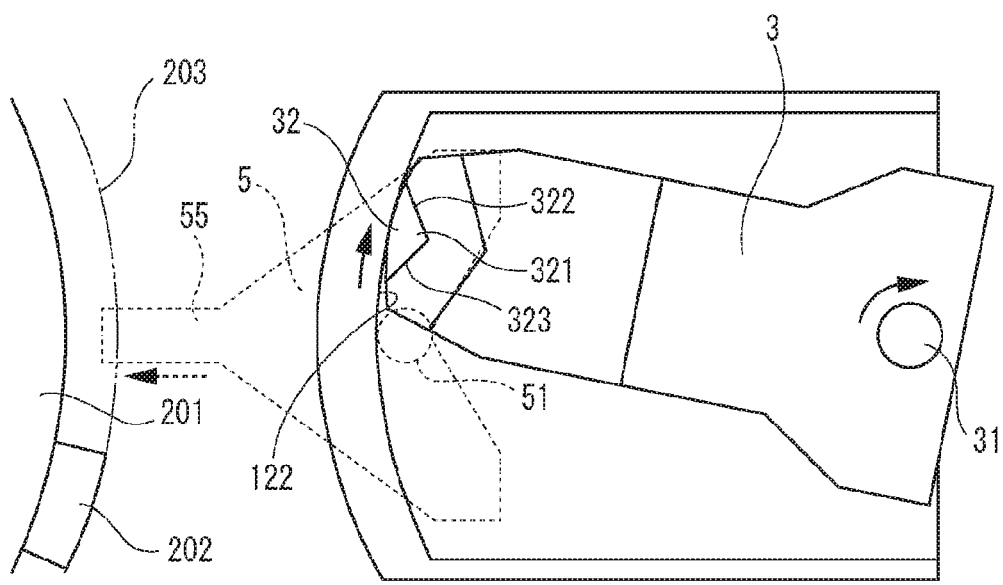
FIG. 11B is a view schematically showing an operation of the direction indication mechanism in FIG. 1.

As shown in FIGS. 11A and 11B, when turning right or changing a route to a right lane, the lever 2 is operated so that the bracket 3 rotates clockwise around the rotation shaft 31.

At this time, the moderation piece 21 slides in the sliding hole 23 of the lever 2 so as to compress the coil spring 22 (against an urging force of the coil spring 22). Therefore, along with the rotation of the bracket 3, a tip end of the moderation piece 21 climbs over a peak portion formed between the neutral holding portion 413 and the right turn holding portion 412 of the moderation surface 41, and moves toward the right turn holding portion 412.

On the other hand, the first rotation shaft 51 of the ratchet 5 moves along the right turn cam surface 323 from the neutral holding portion 321 of the cam surface forming protrusion 32 of the bracket 3. The first rotation shaft 51 is guided along the right turn cam surface 323 and the cam surface 122 of the second case 12 adjacent thereto, and approaches the steering shaft 201. Therefore, the ratchet 5 advances toward the steering shaft 201 by the urging force of the coil spring 72.

When the bracket 3 reaches the right turn indication position, the engagement protrusion 55 of the ratchet 5 enters the rotating trajectory 203 of the cancel cam 202. The right turn indication position is an example of a direction indication position.

On the other hand, the moderation piece 21 is held by the right turn holding portion 412 due to a shape of the right turn holding portion 412 of the moderation surface 41 and the urging force of the coil spring 22, and is prevented from returning to the neutral holding portion 413. Accordingly, a signal for turning on a right turn direction indicator of the vehicle is output from the direction indication mechanism 1 via a switch mechanism which is not shown.

Although not shown, when turning left or changing a route to a left lane, the lever 2 is operated so that the bracket 3 rotates counterclockwise in FIGS. 10A and 10B around the rotation shaft 31.

At this time, the moderation piece 21 slides in the sliding hole 23 of the lever 2 so as to compress the coil spring 22 (against the urging force of the coil spring 22). Therefore, along with the rotation of the bracket 3, the tip end of the moderation piece 21 climbs over a peak portion formed between the neutral holding portion 413 and the left turn holding portion 411 of the moderation surface 41, and moves toward the left turn holding portion 411.

On the other hand, the first rotation shaft 51 of the ratchet 5 moves along the left turn cam surface 322 from the neutral holding portion 321 of the cam surface forming protrusion 32 of the bracket 3. The first rotation shaft 51 is guided along the left turn cam surface 322 and the cam surface 122 of the second case 12 adjacent thereto, and approaches the steering shaft 201. Therefore, the ratchet 5 advances toward the steering shaft 201 by the urging force of the coil spring 72.

When the bracket 3 reaches the left turn indication position, the engagement protrusion 55 of the ratchet 5 enters the rotating trajectory 203 of the cancel cam 202. The left turn indication position is an example of the direction indication position.

On the other hand, the moderation piece 21 is held by the left turn holding portion 411 due to a shape of the left turn holding portion 411 of the moderation surface 41 and the urging force of the coil spring 22, and is prevented from returning to the neutral holding portion 413. Accordingly, a signal for turning on a left turn direction indicator of the vehicle is output from the direction indication mechanism 1 via a switch mechanism which is not shown.

Figure 12A:
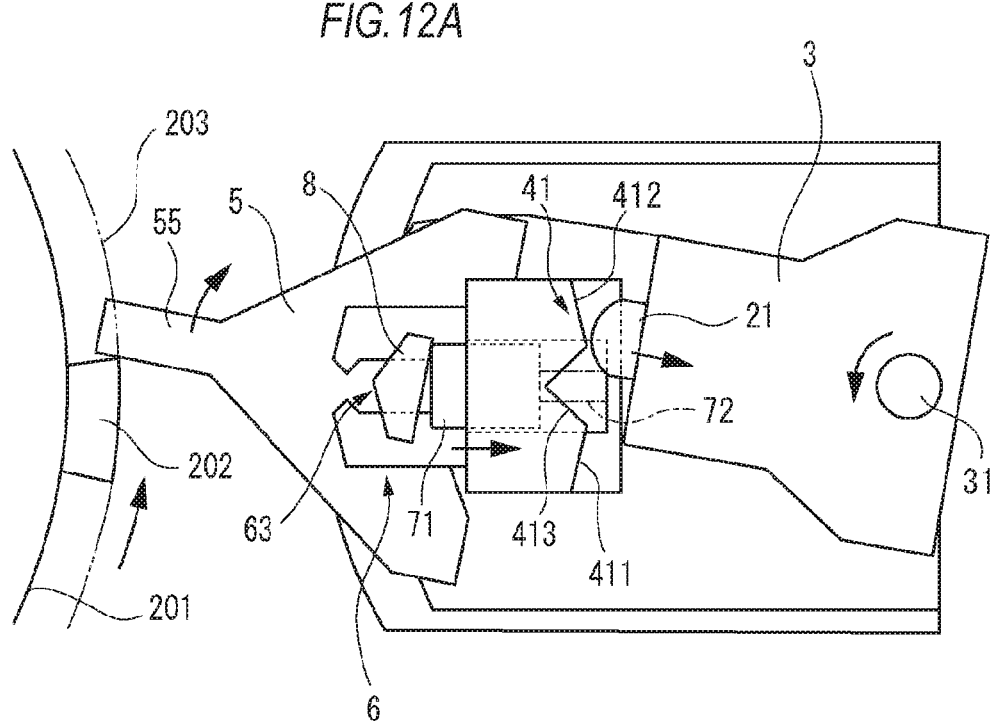
FIG. 12A is a view schematically showing an operation of the direction indication mechanism in FIG. 1.
Figure 12B:
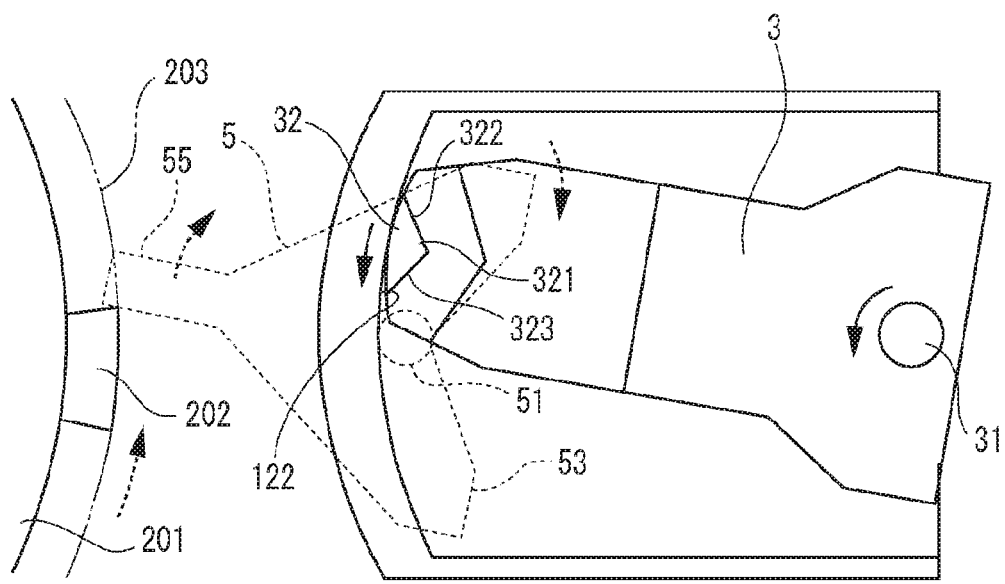
FIG. 12B is a view schematically showing an operation of the direction indication mechanism in FIG. 1.

Next, a cancel operation of a direction indication will be described with reference to FIGS. 12A and 12B. In a state where the bracket 3 is at the right turn indication position shown in FIGS. 11A and 11B, when the steering wheel is rotated counterclockwise (counterclockwise rotation), a right turn indication operation is canceled.

Specifically, along with the counterclockwise rotation of the steering wheel, the cancel cam 202 mounted on the steering shaft 201 rotates counterclockwise, and engages with the engagement protrusion 55 of the ratchet 5 entering the rotating trajectory 203. The ratchet 5 is rotatable around the first rotation shaft 51 and the second rotation shaft 52 in a plane parallel to the rotating trajectory 203. Therefore, the ratchet 5 rotates clockwise around the first rotation shaft 51 and the second rotation shaft 52 so as to allow passage of the cancel cam 202 which rotates counterclockwise.

As shown in FIG. 3, the direction indication mechanism 1 includes a cushioning member 91 and a coil spring 92. The cushioning member 91 and the coil spring 92 are assembled to the bracket 3. Specifically, as shown in FIG. 8, the bracket 3 includes a pair of guide walls 34. The pair of guide walls 34 defines guide grooves 35 indicated by broken lines. Each guide wall 34 includes a cutout portion 341 which is opened upward and communicates with the guide groove 35. The cushioning member 91 includes a pair of locking pieces 911. The cushioning member 91 is arranged between the pair of guide walls 34 by inserting the pair of locking pieces 911 into the pair of guide grooves 35 from the corresponding cutout portions 341, and is slidable along the guide grooves 35.

As shown in FIGS. 8 and 9, a tip end of the cushioning member 91 faces the cam groove 33 of the bracket 3. As shown in FIG. 3, the coil spring 92 urges the cushioning member 91 toward the first rotation shaft 51 of the ratchet 5 arranged inside the cam groove 33. Each of the locking pieces 911 of the cushioning member 91 abuts against a front end of each of the guide grooves 35 to regulate a movement toward the cam groove 33. Besides, the cushioning member 91 is prevented from being separated upward by locking each of the locking pieces 911 to the corresponding guide wall 34.

Along with clockwise rotation of the ratchet 5 which is described above, the right turn cancel cam portion 54 abuts against the cushioning member 91 to apply a counterclockwise rotation force around the rotation shaft 31 to the bracket 3. An urging force of the coil spring 92 is set to such a degree that the cushioning member 91 is not displaced by the rotation force. Therefore, the bracket 3 rotates counterclockwise around the rotation shaft 31 by the rotation force applied from the ratchet 5 through the cushioning member 91.

Accordingly, holding of the moderation piece 21 at the right turn holding portion 412 of the moderation surface 41 is released. The moderation piece 21 climbs over the peak portion formed between the neutral holding portion 413 and the right turn holding portion 412 of the moderation surface 41, and moves toward the neutral holding portion 413.

On the other hand, the first rotation shaft 51 of the ratchet 5 moves along the cam surface 122 of the second case 12 and the right turn cam surface 323 of the cam surface forming protrusion 32 adjacent thereto, and reaches the neutral holding portion 321. Accordingly, the ratchet 5 is pulled away from the steering shaft 201 against the urging force of the coil spring 72.

When the bracket 3 returns to the neutral position shown in FIGS. 10A and 10B, the output of the signal for turning on the right turn direction indicator of the vehicle is stopped.

A driver may rotate the steering wheel counterclockwise in a state in which an operating force for steering to the right is applied to the lever 2. Even in this case, the ratchet 5 is rotated clockwise by the cancel cam 202 which rotates counterclockwise, and the right turn cancel cam portion 54 abuts against the cushioning member 91. Since the bracket 3 is held at the right turn indication position by the operating force applied to the lever 2, a greater force than a force for a normal right turn cancel operation is applied from the ratchet 5 to the cushioning member 91.

The coil spring 92 is configured to be compressed and deformed against such a force. Therefore, the cushioning member 91 is displaced so as to retract from the ratchet 5. The ratchet 5 continues to rotate clockwise while the bracket 3 is held at the right turn indication position. Accordingly, damage to a mechanism caused by inputting the operating force for steering to the left from the steering shaft 201 while inputting the operating force for steering to the right from the lever 2 is prevented.

Although not shown, in a state where the bracket 3 is at the left turn indication position, when the steering wheel is rotated clockwise (clockwise rotation), a left turn indication operation is canceled.

Specifically, along with the clockwise rotation of the steering wheel, the cancel cam 202 mounted on the steering shaft 201 rotates clockwise, and engages with the engagement protrusion 55 of the ratchet 5 entering the rotating trajectory 203. Therefore, the ratchet 5 rotates counterclockwise around the first rotation shaft 51 and the second rotation shaft 52 so as to allow passage of the cancel cam 202 which rotates clockwise.

The left turn cancel cam portion 53 of the ratchet 5 abuts against the cushioning member 91 to apply a clockwise rotation force around the rotation shaft 31 to the bracket 3. The urging force of the coil spring 92 is set to such a degree that the cushioning member 91 is not displaced by the rotation force. Therefore, the bracket 3 rotates clockwise around the rotation shaft 31 by the rotation force applied from the ratchet 5 through the cushioning member 91.

Accordingly, holding of the moderation piece 21 at the left turn holding portion 411 of the moderation surface 41 is released. The moderation piece 21 climbs over the peak portion formed between the neutral holding portion 413 and the left turn holding portion 411 of the moderation surface 41, and moves toward the neutral holding portion 413.

On the other hand, the first rotation shaft 51 of the ratchet 5 moves along the cam surface 122 of the second case 12 and the left turn cam surface 322 of the cam surface forming protrusion 32 adjacent thereto, and reaches the neutral holding portion 321. Accordingly, the ratchet 5 is pulled away from the steering shaft 201 against the urging force of the coil spring 72.

When the bracket 3 returns to the neutral position shown in FIGS. 10A and 10B, the output of the signal for turning on the left turn direction indicator of the vehicle is stopped.

A driver may rotate the steering wheel clockwise in a state in which the operating force for steering to the left is applied to the lever 2. Even in this case, the ratchet 5 is rotated counterclockwise by the cancel cam 202 which rotates clockwise, and the left turn cancel cam portion 53 abuts against the cushioning member 91. Since the bracket 3 is held at the right turn indication position by the operating force applied to the lever 2, a greater force than a force for a normal left turn cancel operation is applied from the ratchet 5 to the cushioning member 91.

The coil spring 92 is configured to be compressed and deformed against such a force. Therefore, the cushioning member 91 is displaced so as to retract from the ratchet 5. The ratchet 5 continues to rotate counterclockwise while the bracket 3 is held at the left turn indication position. Accordingly, damage to the mechanism caused by inputting the operating force for steering to the right from the steering shaft 201 while inputting the operating force for steering to the left from the lever 2 is prevented.

As described above, the bracket 3 is rotatable between the neutral position and the left turn indication position or right turn indication position in response to the operation of the lever 2 by a user. The ratchet 5 is slidable between a position where it enters the rotating trajectory 203 of the cancel cam 202 mounted on the steering shaft 201 of the vehicle and a position where it retracts from the rotating trajectory 203 interlocking with the rotation of the bracket 3.

The guide groove 63 of the first regulating member 6 guides the sliding of the ratchet 5 and regulates the displacement of the ratchet 5 in a direction along the rotating trajectory 203 of the cancel cam 202. The second regulating member 8 provided on the ratchet 5 regulates the displacement of the ratchet 5 in a direction intersecting both a sliding direction of the ratchet 5 and the direction along the rotating trajectory 203 of the cancel cam 202. Accordingly, the posture of the ratchet 5 during the direction indication operation and during the cancel operation of the direction indication is stabilized.

In the present embodiment, one end of the guide groove 63 is opened toward the rotating trajectory 203 of the cancel cam 202. In other words, the guide groove 63 includes an open end 631.

According to the configuration, although the second regulating member 8 which regulates the displacement of the ratchet 5 in the direction intersecting both the sliding direction of the ratchet 5 and the direction along the rotating trajectory 203 of the cancel cam 202 is provided on the ratchet 5, the ratchet 5 can be efficiently assembled with respect to the first regulating member 6 which regulates the displacement of the ratchet 5 in the direction along the rotating trajectory 203 of the cancel cam 202.

In the above-described configuration, one end of the guide groove 63 is the open end 631. Therefore, assembly of the ratchet 5 to the first regulating member 6 can be completed only by making the second rotation shaft 52 of the ratchet 5 enter into the guide groove 63 through the open end 631, a state where the displacement of the ratchet 5 is regulated by the second regulating member 8 can be established. Since it is unnecessary to change the posture of the ratchet 5 in order to establish this state, it is easy to automate an assembly process. Therefore, efficiency of an assembly work of the direction indication mechanism 1 can be improved, and an increase in manufacturing cost can be suppressed.

As described with reference to FIGS. 7A and 7B, the first regulating member 6 includes the first protrusion 611 and the second protrusion 621. The first protrusion 611 and the second protrusion 621 are arranged inside the guide groove 63, and regulates the displacement of the ratchet 5 toward the rotating trajectory 203 of the cancel cam 202.

The first arm portion 61 and the second arm portion 62 of the first regulating member 6 are slightly deformable in a direction in which a width of the guide groove 63 is widened. When the ratchet 5 is assembled to the first regulating member 6, by pressing the second rotation shaft 52 of the ratchet 5 against the first protrusion 611 and the second protrusion 621, the first arm portion 61 and the second arm portion 62 are flexibly deformed such that the width of the guide groove 63 is widened. When the second rotation shaft 52 enters the guide groove 63 through the open end 631, the first arm portion 61 and the second arm portion 62 return to an original state, and the above-described regulation by the first protrusion 611 and the second protrusion 621 can be established.

According to the configuration, once the ratchet 5 is assembled to the first regulating member 6, the ratchet 5 can be prevented from falling off the open end 631 of the guide groove 63. Particularly, when the assembly of the ratchet 5 with respect to the first regulating member 6 is completed, and then these are further assembled to other components to manufacture the direction indication mechanism 1, since the ratchet 5 can be prevented from falling off the open end 631, the efficiency of the assembly work can be improved.

Namely, particularly, the open end 631 of the guide groove 63 provided for improving the efficiency of assembling the ratchet 5 to the first regulating member 6 can avoid a situation where the efficiency of the assembly work of the direction indication mechanism 1 is hindered for another reason.

As described above, the moderation surface forming member 4 forms the moderation surface 41. The moderation piece 21 is displaced along the moderation surface 41 with the rotation of the bracket 3, so that the bracket 3 is held at one of the neutral position, the left turn indication position, and the right turn indication position.

As shown in FIGS. 7A and 7B, in the present embodiment, the moderation surface forming member 4 and the first regulating member 6 are integrally molded to be an integrally molded article.

According to the configuration, a function of regulating a position of the moderation piece 21 and a function of regulating the posture of the ratchet 5 can be integrated into one component. Besides, since an increase in the number of components can be suppressed, the efficiency of the assembly work of the direction indication mechanism 1 can be improved.

The above-described embodiment is merely an example for facilitating understanding of the present disclosure. A configuration according to the above-described embodiment can be modified and improved as appropriate without departing from the spirit of the present disclosure.

A shape of the ratchet 5 and the second regulating member 8 provided on the ratchet 5 is not limited to a shape exemplified with reference to the above embodiment. As long as it is possible to regulate the displacement of the ratchet 5 in the direction intersecting both the sliding direction of the ratchet 5 and the direction along the rotating trajectory 203 of the cancel cam 202, the shape of the ratchet 5 and the second regulating member 8 can be appropriately selected.

In the above-described embodiment, in the first regulating member 6, the first protrusion 611 and the second protrusion 621 are arranged inside the guide groove 63. However, a configuration in which only one of the first protrusion 611 and the second protrusion 621 is provided may also be used as long as the displacement of the ratchet 5 toward the rotating trajectory 203 of the cancel cam 202 can be regulated.

The content of Japanese Patent Application No. 2016-213503 filed on Oct. 31, 2016 is incorporated as a part of the present disclosure.

The invention claimed is:

1. A direction indication mechanism to be mounted on a vehicle, the direction indication mechanism comprising:
   a rotating member which is rotatable between a neutral position and a direction indication position in response to an operation by a user;
   a ratchet which is slidable between a position where the ratchet enters a rotating trajectory of a cancel cam mounted on a steering shaft of the vehicle and a position where the ratchet retracts from the rotating trajectory interlocking with rotation of the rotating member;

a first regulating member which defines a groove that guides sliding of the ratchet and that regulates displacement of the ratchet in a direction along the rotating trajectory; and a second regulating member which is provided on the ratchet and which regulates displacement of the ratchet in a direction intersecting both a sliding direction of the ratchet and the direction along the rotating trajectory, wherein one end of the groove is opened toward the rotating trajectory, and wherein a protrusion which regulates displacement of the ratchet toward the rotating trajectory is arranged inside the groove.

2. The direction indication mechanism according to claim 1, further comprising:

a moderation surface forming member which forms a moderation surface having at least one of a concave portion and a convex portion; and a moderation piece which holds the rotating member at one of the neutral position and the direction indication position by being displaced along the moderation surface with the rotation of the rotating member, wherein the moderation surface forming member and the first regulating member are integrally molded to be an integrally molded article.

* * * * *

UNITED STATES PATENT AND TRADEMARK OFFICE
CERTIFICATE OF CORRECTION

PATENT NO. : 11,014,491 B2
APPLICATION NO. : 16/345930
DATED : May 25, 2021
INVENTOR(S) : K. Misaka et al.

Page 1 of 1

It is certified that error appears in the above-identified patent and that said Letters Patent is hereby corrected as shown below:

On the Title Page

Item (57)/Abstract, Line 8, please change "ratchet that" to -- ratchet and that --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*